(12) United States Patent
Diwan et al.

(10) Patent No.: US 10,275,450 B2
(45) Date of Patent: Apr. 30, 2019

(54) METHOD AND SYSTEM FOR MANAGING DATA QUALITY FOR SPANISH NAMES AND ADDRESSES IN A DATABASE

(71) Applicant: Tata Consultancy Services Limited, Mumbai (IN)

(72) Inventors: Ashish Diwan, Pune (IN); Nandish Kirtikumar Solanki, Pune (IN); Sridhar G. Pattar, Pune (IN); Sudhir Kumar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/271,139

(22) Filed: Sep. 20, 2016

(65) Prior Publication Data

US 2017/0262426 A1 Sep. 14, 2017

(30) Foreign Application Priority Data

Feb. 15, 2016 (IN) .............................. 201621005259

(51) Int. Cl.
  *G06F 17/27* (2006.01)
  *G06F 17/30* (2006.01)
(52) U.S. Cl.
  CPC ........ *G06F 17/277* (2013.01); *G06F 17/2705* (2013.01); *G06F 17/278* (2013.01); *G06F 17/2735* (2013.01); *G06F 17/2755* (2013.01); *G06F 17/30023* (2013.01); *G06F 17/30675* (2013.01)

(58) Field of Classification Search
  CPC ............. G06F 17/2705; G06F 17/2755; G06F 17/278; G06F 17/30; G06F 17/30023
  See application file for complete search history.

(56) References Cited

U.S. PATENT DOCUMENTS

| | | | | |
|---|---|---|---|---|
| 4,965,763 A | * | 10/1990 | Zamora | G06F 17/2745 704/1 |
| 5,784,635 A | * | 7/1998 | McCallum | G06F 17/2705 710/63 |
| 6,272,495 B1 | * | 8/2001 | Hetherington | G06F 17/30684 |
| 8,423,563 B2 | | 4/2013 | McPeake et al. | |

(Continued)

*Primary Examiner* — Eric Yen
(74) *Attorney, Agent, or Firm* — Finnegan, Henderson, Farabow, Garrett & Dunner LLP

(57) ABSTRACT

A method and system to identify similar names and addresses from given data set comprising plurality of names and addresses. The invention more specifically addresses the challenge faced in Spanish data quality assurance. The name and data is parsed through parsing engine to parse the plurality of Spanish names and addresses. The parsed Spanish names and addresses are sent to a Probable identification engine to identify the probable matches. The combination of name and address matching process can be used for assuring data quality for Spanish names and addresses. The Spanish name matching process consists of identification of probable matches and finding similarity percentages between those probable. Similarly, the Spanish address matching process consists of identification of probable matches (criteria like same city) and finding similarity percentages between those probable. The system includes a parsing engine, a probable identification engine and a match percentage calculation engine.

3 Claims, 11 Drawing Sheets

(56) References Cited

U.S. PATENT DOCUMENTS

| | | | |
|---|---|---|---|
| 2002/0016818 A1* | 2/2002 | Kirani | G06F 17/30902 |
| | | | 709/203 |
| 2002/0111951 A1* | 8/2002 | Zeng | G06F 17/2705 |
| 2002/0138248 A1* | 9/2002 | Corston-Oliver | G06F 17/271 |
| | | | 704/1 |
| 2006/0047500 A1* | 3/2006 | Humphreys | G06F 17/278 |
| | | | 704/9 |
| 2006/0129543 A1* | 6/2006 | Bates | G06F 17/273 |
| 2007/0005586 A1* | 1/2007 | Shaefer, Jr. | G06F 17/2705 |
| 2007/0033174 A1* | 2/2007 | Cornacchia, III | |
| | | | G06F 17/30681 |
| 2008/0162513 A1* | 7/2008 | Biard | G01C 21/28 |
| 2012/0016660 A1 | 1/2012 | Gillam et al. | |
| 2014/0156263 A1* | 6/2014 | Patman Maguire | |
| | | | G06F 17/2785 |
| | | | 704/9 |
| 2014/0279864 A1* | 9/2014 | Lopyrev | G06F 17/30569 |
| | | | 707/609 |

* cited by examiner

METHOD AND SYSTEM FOR MANAGING DATA QUALITY FOR SPANISH NAMES AND ADDRESSES IN A DATABASE

CROSS-REFERENCE TO RELATED APPLICATIONS AND PRIORITY

The present application claims priority from Indian non-provisional specification no. 201621005259 filed on 15 Feb. 2016, the complete disclosure of which, in its entirety is herein incorporated by references.

TECHNICAL FIELD

The present invention relates to a method and system for maintaining data quality in a database. More particularly, the present invention, in various specific embodiments, involves methods and systems directed to providing matching of Spanish names & addresses to fine tune the data quality.

BACKGROUND

Maintaining and managing software data quality has always been a big issue for enterprises. Data and business environments do changes very rapidly, including big data, unstructured data. Data governance is also been a quite challenging. Business is looking to data as the foundation points for the key strategic initiatives within the organization. To perform meaningful activity, organizations need to ensure that the database is designed correctly and the data is accurate. Without proper data management, business cannot run effectively. There are a number of data quality issues exist in the eco system such as correctness of data entered to the system, technical issues in data processing, data analytics, mapping data as per business requirements. Therefore a system needs to be designed to interpret and address these issues.

The quality of data and accuracy becomes more critical when the data are related to names and address. While it might be easy to check names and address against a list, there are a number of practical problems in finding accurately a particular person by name and given address. Firstly, the lists may have spelling errors, abbreviations, common address type (e.g. Madrid road, Valencia stop etc. and other anomalies which make matching on the list extremely difficult. These lists may also contain a mixing up business names, individual names, common address with without PIN code and aliases. In addition to these a lot of names may originate from foreign countries, which adds even more complexity to the name matching process. For all of these reasons, it is quite difficult to determine the data mapping and matching for a given set of names and addresses.

For all of these reasons, recognition and matching of name and address are extremely difficult tasks. Exact string matches also has very limited utility as a match will not be recognized if there is any discrepancy between two or more names and address. Many relational database systems now including a "soundex" function for comparing two slightly dissimilar strings. These functions are mainly based on a "Soundex" system that was originally developed as an index filing system for grouping similar sounding names. The initial version was patented by Robert C. Russell in 1918 as U.S. Pat. No. 1,261,167. Russell's system, which also known as "soundex" or "soundexing", used a simple phonetic algorithm for reducing a name to a four character alphanumeric code. The first letter of the code corresponds to the first letter of the last name. The remaining three digits of the code consist of numerals derived from the syllables of the word.

In Spanish language, a person's name consists of a given name (simple or composite) followed by two family names (surnames). Person bears a single or composite given name (nombre) and two surnames (apellidos). A composite given name comprises two (not more) single names; for example Juan Pablo is considered not to be a first and a second forename, but a single composite forename. Traditionally, a person's first surname is the father's first surname (apellido paterno), and the second one is the mother's first surname (apellido materno). For example:—Name:—Eduardo Fernández Garrido and ForeName:—Eduardo, Surname1:—Fernández, and Surname2:—Garrido. Further Each surname can also be composite, the parts usually linked by the conjunction y or e (and), by the preposition de (of) or by a hyphen, for example Name:—Juan Pablo Fernández de Calderón García-Iglesias and ForeName:—Juan Pablo, Surname1:—Fernández de Calderón and Surname2:—García-Iglesias.

Many database experts have implemented lot variations of the Soundex function for use in their database systems as a system and method for comparing slightly dissimilar strings. Although Soundex functions prompt users to find information based on phonetic similarities, they are well known to be too coarse for reliable name matching. In addition, the implementation may change for various database vendors.

SUMMARY

Embodiments of the present disclosure present technological improvements as solutions to one or more of the above-mentioned technical problems recognized by the inventors in conventional systems.

In view of the foregoing, an embodiment herein provides a method for managing data quality for the plurality of Spanish names in a database. Initially the plurality of similar Spanish names are provided by a name parsing engine. At the next step a plurality of parsed Spanish name is generated by the name parsing engine. The plurality of parsed Spanish names are then received by a probable name identification engine. A plurality of Spanish name probable matches are then generated by the probable name identification engine. The plurality of Spanish name probable matches received by a name match percentage calculation engine. In the next step, the matching percentage is calculated between the plurality of Spanish name probable matches by the name match percentage calculation engine. And, finally one or more probable matches are generated by the name match percentage calculation engine.

Another embodiment provides a method for managing data quality for the plurality of Spanish addresses in a database. Initially the plurality of Spanish addresses are provided by an address parsing engine. At the next step, plurality of parsed Spanish addresses generated a by the address parsing engine. The plurality of parsed Spanish addresses are received by a Probable identification engine. In the next step, a plurality of Spanish addresses probable matches are generated by the Probable address identification engine. In the next step, the plurality of Spanish addresses probable matches are provided to a match percentage calculation engine, wherein the match percentage calculation engine calculates matching percentage between two probable matches using predefined method. And finally one or more probable matches are generated by the match percentage calculation engine.

Yet another embodiment provides a system for managing data quality in a database for identification and matching a plurality of similar Spanish names and addresses for a given set of data. The system includes a parsing engine, a probable identification engine, a match percentage calculation engine and a database. The parsing engine receives plurality of similar Spanish names and addresses. The parsing engine generates a set of parsed Spanish names and addresses. The probable identification engine receives the parsed Spanish names and address. The probable identification engine generates probable matches of a plurality of Spanish names and addresses. The match percentage calculation engine calculates the plurality of Spanish names and addresses probable matches. The match percentage calculation engine generates one or more probable matches by the names and addresses match. And finally the database stores one or more matched Spanish names and addresses.

In another embodiment, a non-transitory computer-readable medium having embodied thereon a computer program for managing data quality for the plurality of Spanish names in a database. Initially the plurality of similar Spanish names are provided by a name parsing engine. At the next step a plurality of parsed Spanish name is generated by the name parsing engine. The plurality of parsed Spanish names are then received by a probable name identification engine. A plurality of Spanish name probable matches are then generated by the probable name identification engine. The plurality of Spanish name probable matches received by a name match percentage calculation engine. In the next step, the matching percentage is calculated between the plurality of Spanish name probable matches by the name match percentage calculation engine. And, finally one or more probable matches are generated by the name match percentage calculation engine.

It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed.

Figure 1:
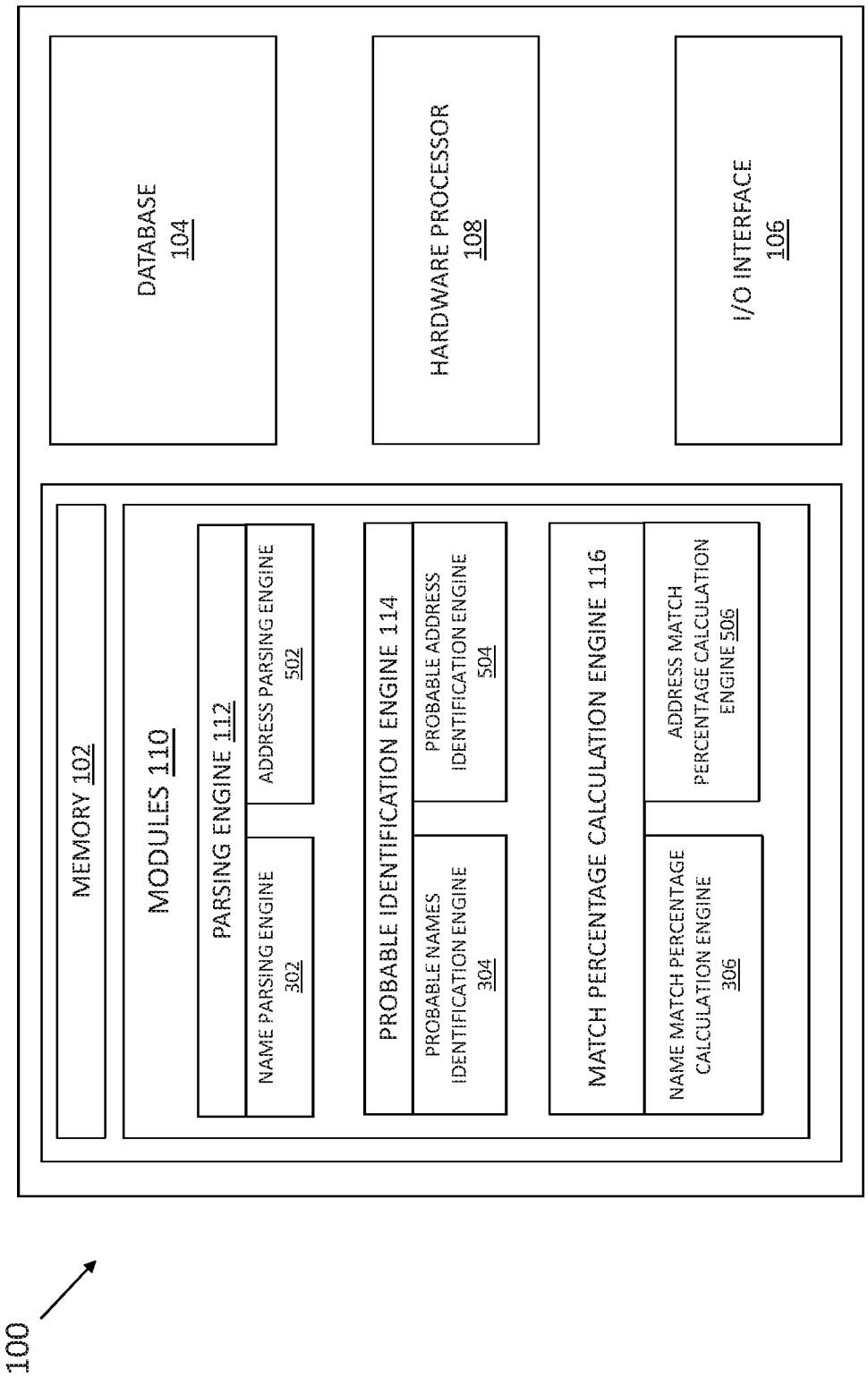
FIG. 1 shows a block diagram shows the system for identifying similar Spanish names and addresses from given data set in a database, in accordance with an embodiment of the invention.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms. The elements illustrated in the Figures interoperate as explained in more detail below. Before setting forth the detailed explanation, however, it is noted that all of the discussion below, regardless of the particular implementation being described, is exemplary in nature, rather than limiting.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present invention provides a method and system to identify similar names and addresses from given data set comprising plurality of names and addresses. The invention more specifically addresses the challenge faced in Spanish data quality assurance. One or more uncommon data type in Spanish names and addresses is parsed through a parsing engine to parse the data. The parsed names and address data is sent to Probable identification engine to identify the probable matches. The combination of names and addresses matching process can be used for assuring data quality for Spanish names and addresses. The Spanish names matching process consists of identification of probable matches and finding similarity percentages between those probable. Similarly, the Spanish addresses matching process consists of identification of probable matches (criteria like same city) and finding similarity percentages between those probable. The system includes a parsing engine, a probable identification engine and a match percentage calculation engine.

FIG. 1 illustrates a schematic block diagram of a system (100) for identifying and matching a plurality of Spanish names and addresses for a given set of data according to an illustrative embodiment of the present invention. The system (100) comprises a memory (102), a database (104), hardware processor (108) and an input/output (i/o) interface (106). The memory (102) further includes one or more modules 110 (or modules 110). The memory 102, the database (104), the input/output (i/o) interface (106), hardware processor (108) and/or the modules (110) may be coupled by a system bus or a similar mechanism.

The memory 102, may store instructions, any number of pieces of information, and data, used by a computer system, for example the system for managing data quality for Spanish names and addresses in a database (104) to implement the functions (or embodiments) of the present disclosure. The memory (102) may include for example, volatile memory and/or non-volatile memory. Examples of volatile memory may include, but are not limited to volatile random access memory (ram). The non-volatile memory may additionally or alternatively comprise an electrically erasable programmable read only memory (eeprom), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory (102) may be configured to store information, data, applications, instructions or the like for enabling the system for managing data quality for Spanish names and addresses in a database (104) to carry out various functions in accordance with various example embodiments.

Additionally or alternatively, the memory (102) may be configured to store instructions which when executed by the hardware processor (108) causes the system for managing data quality for Spanish names and addresses in a database (104) to behave in a manner as described in various embodiments (e.g., providing Spanish names and address to the parsing engine, matching probable etc., if any). The memory (102) stores information for example, information comprising at least one set Spanish names and address.

According to an embodiment of the invention, the hardware processor (108) may be implemented as one or more microprocessors, microcomputers, microcontrollers, digital signal processors, central processing units, state machines, logic circuitries, and/or any devices that manipulate signals based on operational instructions. Further, the hardware processor (108) may comprise a multi-core architecture. Among other capabilities, the hardware processor (108) is configured to fetch and execute computer-readable instructions or modules stored in the memory (102). The hardware processor (108) may include circuitry implementing, among others, audio and logic functions associated with the communication. For example, the hardware processor (108) may include, but are not limited to, one or more digital signal processors (dsps), one or more microprocessor, one or more special-purpose computer chips, one or more field-programmable gate arrays (fpgas), one or more application-specific integrated circuits (asics), one or more computer(s), various analog to digital converters, digital to analog converters, and/or other support circuits.

The hardware processor (108) thus may also include the functionality to generate Spanish names and address. The hardware processor (108) may include, among other things, a clock, an arithmetic logic unit (alu) and logic gates configured to support operation of the hardware processor (108). Further, the hardware processor (108) may include functionality to execute one or more software programs, which may be stored in the memory (102) or otherwise accessible to the hardware processor (108). The hardware processor (108) is configured to receive one or more Spanish names and one or more addresses.

The system for managing data quality for Spanish names and addresses in a database further comprised of a set of modules (110) which sends instruction to the database (104), wherein the modules (110) comprises of a parsing engine (112), a probable identification engine (114), and a match percentage calculation engine (116). The parsing engine 112 further comprised of a name parsing engine (302) and an address parsing engine (502). The name parsing engine (302) receives Spanish name as input and generate parsed Spanish name as output. The address parsing engine (502) receives one or more Spanish address as input and generates parsed Spanish addresses as output. The probable identification engine (114), further comprised of a probable name identification engine (304), wherein the probable name identification engine (304) identifies the possible matches for Spanish name and a probable addresses identification engine (504), wherein the probable addresses identification engine (504) identifies the possible matches for Spanish addresses. The match percentage calculation engine (116) further comprises a name match percentage calculation engine (306), wherein the name match percentage calculation engine (306) calculates the percentage matches between plurality of Spanish names as input and generate matching percentages for every set as output, and an address match percentage calculation engine (506) calculates the percentage matches between plurality of Spanish addresses as input and generate matching percentages for every set as output.

Figure 2A:
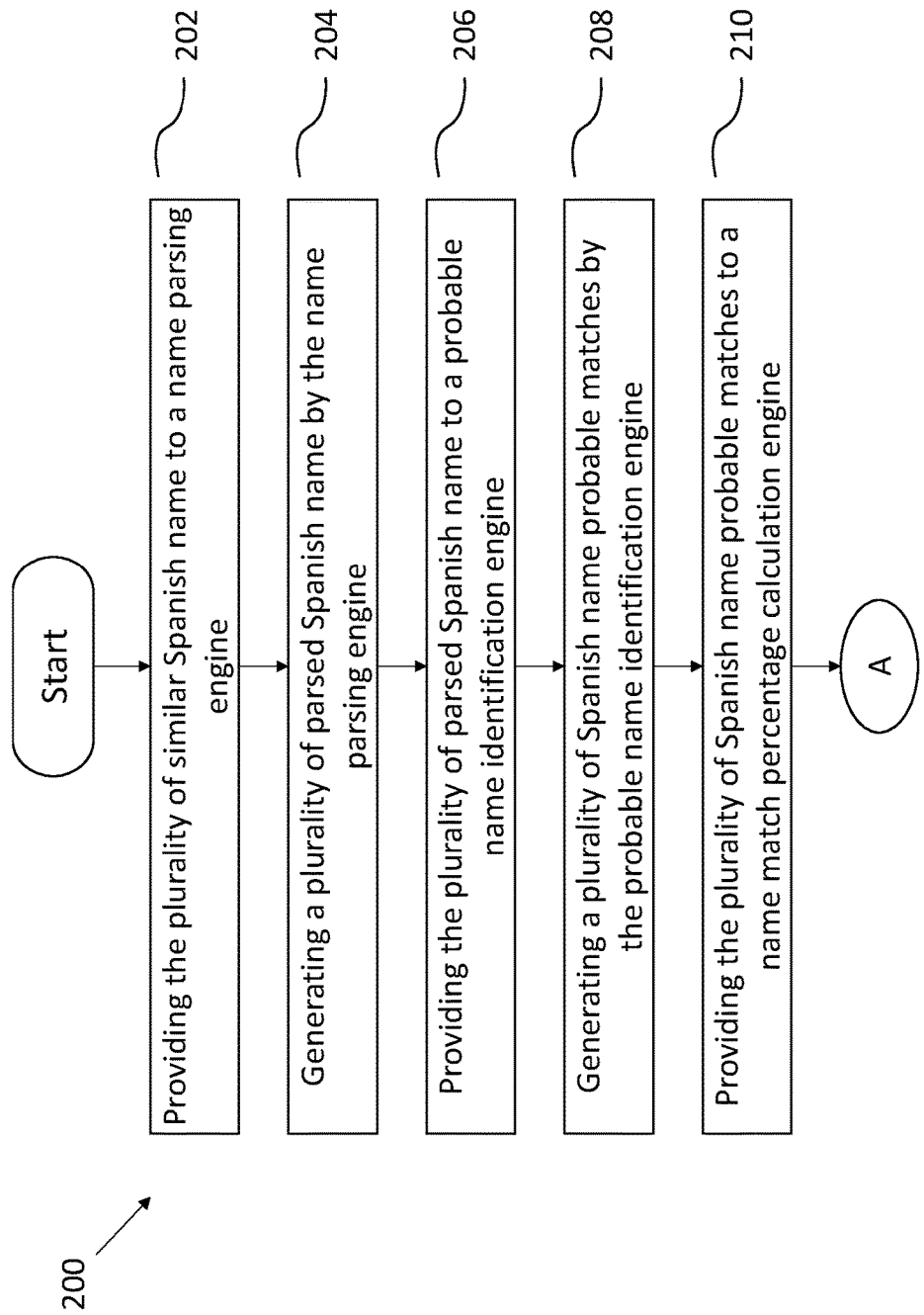
FIG. 2A and FIG. 2B show a flow diagram illustrating steps involved in identifying similar Spanish names from given data, in accordance with an embodiment of the invention.
Figure 2B:
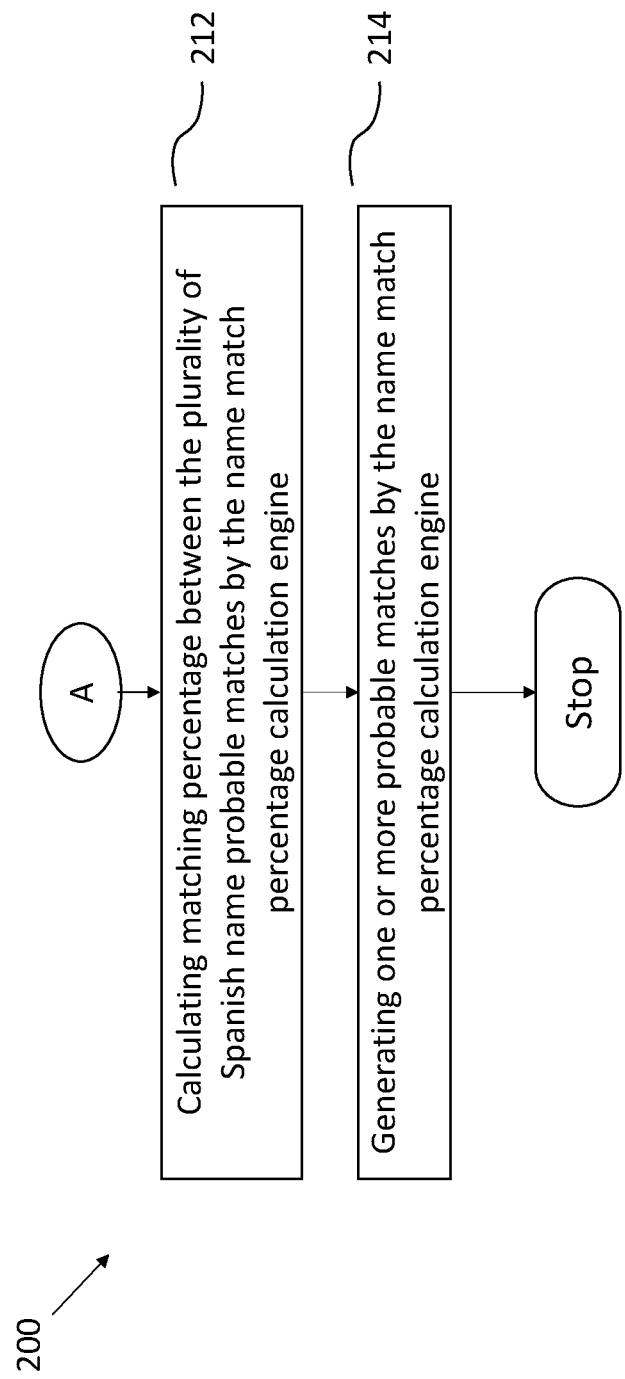

FIG. 2A and FIG. 2B illustrate a flowchart (200) indicating the steps performed within the modules (110). At step (202), a set of similar Spanish names are provided to a name parsing engine (302). At step (204), the name parsing engine (302) generates a plurality of parsed Spanish names. At step (206), the parsed Spanish names are provided to a probable name identification engine (304). At step (208), the probable name identification engine (304) generates a plurality of Spanish name probable matches. At step (210), the plurality of Spanish name probable matches are provided to a name match percentage calculation engine (306). At step (212), the name match percentage calculation engine (306) calculates matching percentage between the plurality of Spanish name probable matches. At step (214), the generated one or more probable matches are stored in the database (104).

Figure 3:
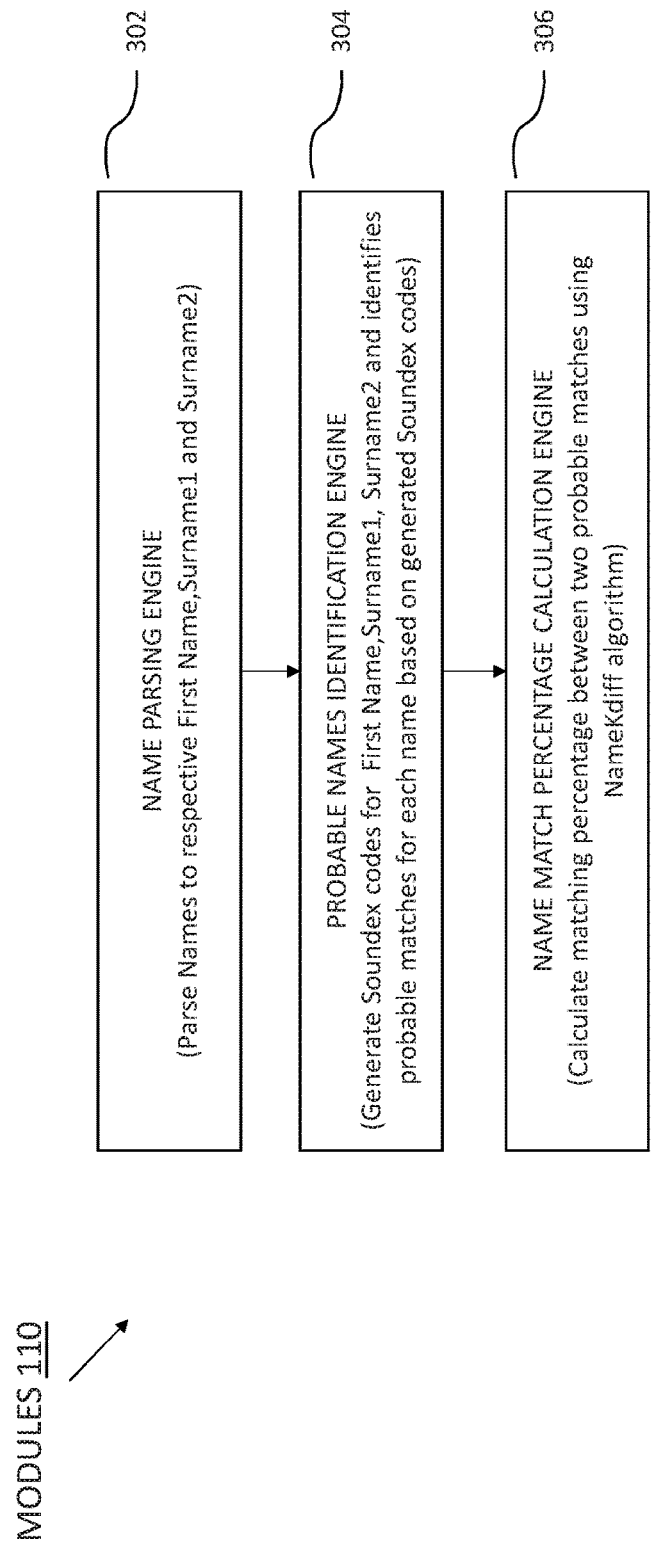
FIG. 3 shows a flow diagram illustrating in detail process of checking for a name match, in accordance with an embodiment of the invention.

FIG. 3 illustrates a block diagram of the name module (110), wherein the module further comprises of a name parsing engine (302), a probable name identification engine (304), and a name match percentage calculation engine (306). The name parsing engine (302) parse one or more First Name, and one or more Surname1 and Surname2. The probable name identification engine (304) generates a Soundex codes for said first name, and one or more surname1, surname2 and identifies one or more probable matches for each name based on the generated Soundex codes. The name match percentage calculation engine (306), calculate the matching percentage between two probable matches using a NameKdiff algorithm.

One or more components of the invention are described as module for the understanding of the specification. For example, In Spain, a person's name consists of a given name (simple or composite) followed by two family names (surnames). People bear a single or composite given name (nombre) and two surnames (apellidos). A composite given name comprises two (not more) single names; for example Juan Pablo is considered not to be a first and a second forename, but a single composite forename. Traditionally, a person's first surname is the father's first surname (apellido paterno), and the second one is the mother's first surname (apellido materno).

Example:—Name:—Eduardo Fernández Garrido
    ForeName:—Eduardo, Surname1:—Fernández,
    Surname2:—Garrido Each surname can also be composite, the parts usually linked by the conjunction y or e (and), by the preposition de (of) or by a hyphen Example:—Name:—Juan Pablo Fernández de Calderón García-Iglesias
    ForeName:—Juan Pablo, Surname1:—Fernández de Calderón
    Surname2:—García-Iglesias.

Name Parsing Engine parse Name, First surname and Second Surname from given Person Name.

Figure 6:
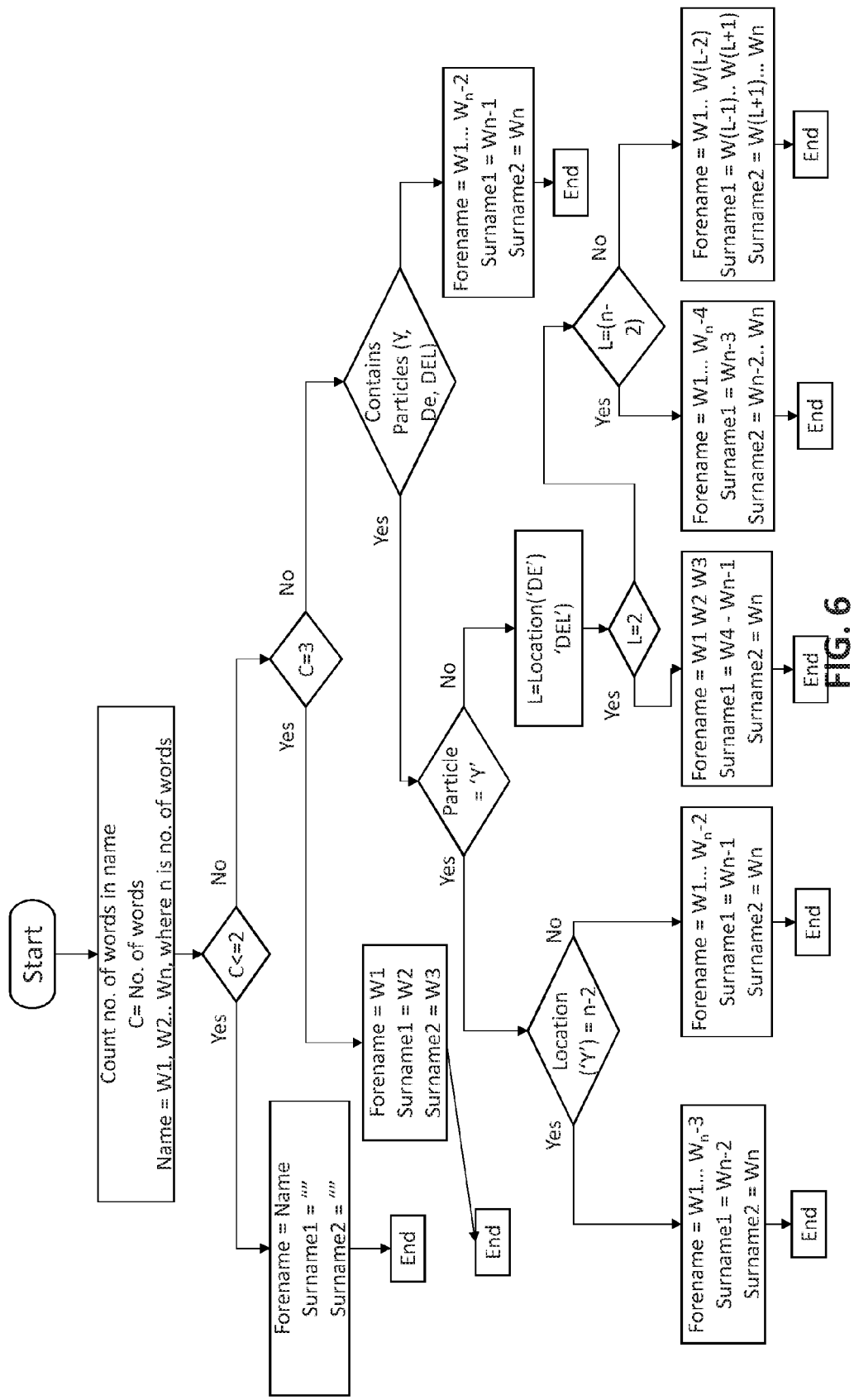
FIG. 6 shows a flow diagram illustrating the name parsing logic explaining the flow of parsed name, in accordance with an embodiment of the invention.

FIG. 6 illustrates the name parsing logic explaining the flow of parsed name according to an embodiment of the invention.

One or more components of the invention are described as module for the understanding of the specification. The probable name identification engine generates a soundex code where in the soundex code is a phonetic algorithm for indexing plurality of names by sound. The soundex code encodes a set of homophones, wherein the homophones are a one or more set of words those are pronounced the same as another word but differs in meaning, and may differ in spelling for the soundex code representation. The generated soundex code can be matched despite minor differences in one or more spelling. (As per FIG. 3) the probable name identification engine (304) contains two sub processes i.e. generation of one or more soundex codes and identification of one or more probables. Where in the generation of soundex code is generated for Forename, Surname1 and Surname2 individually. And the identification of Probable name matches satisfies one of the different possible combination of Soundex (Forename), Soundex (Surname1) and Soundex (Surname2) are consider as probable matches.

Figure 7:
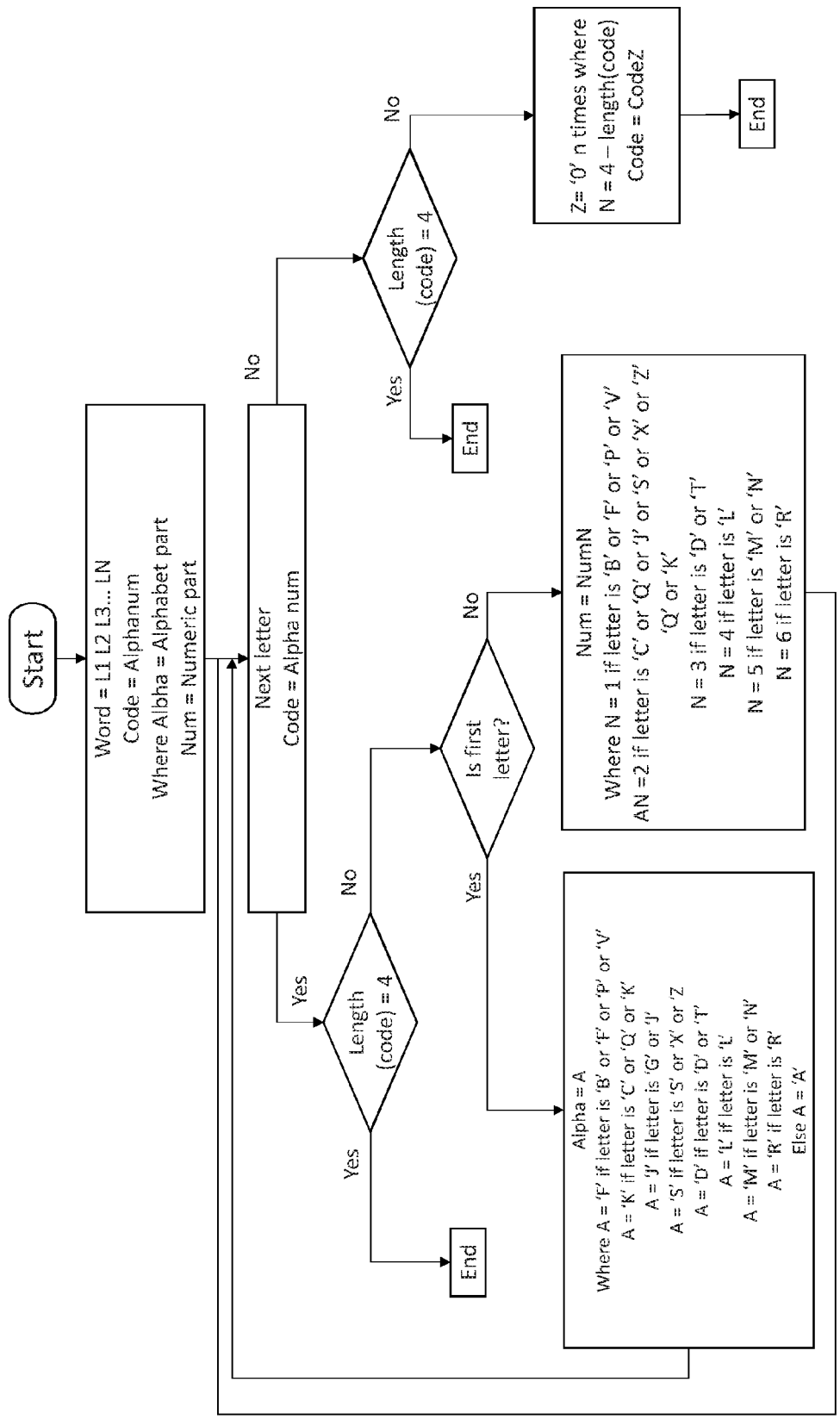
FIG. 7 shows a flow diagram of Soundex algorithm, in accordance with an embodiment of the invention.

FIG. 7 illustrates name parsing logic explaining the flow of parsed name which generate one or more said soundex code. The Soundex algorithm is illustrated in FIG. 7.

Figure 8:
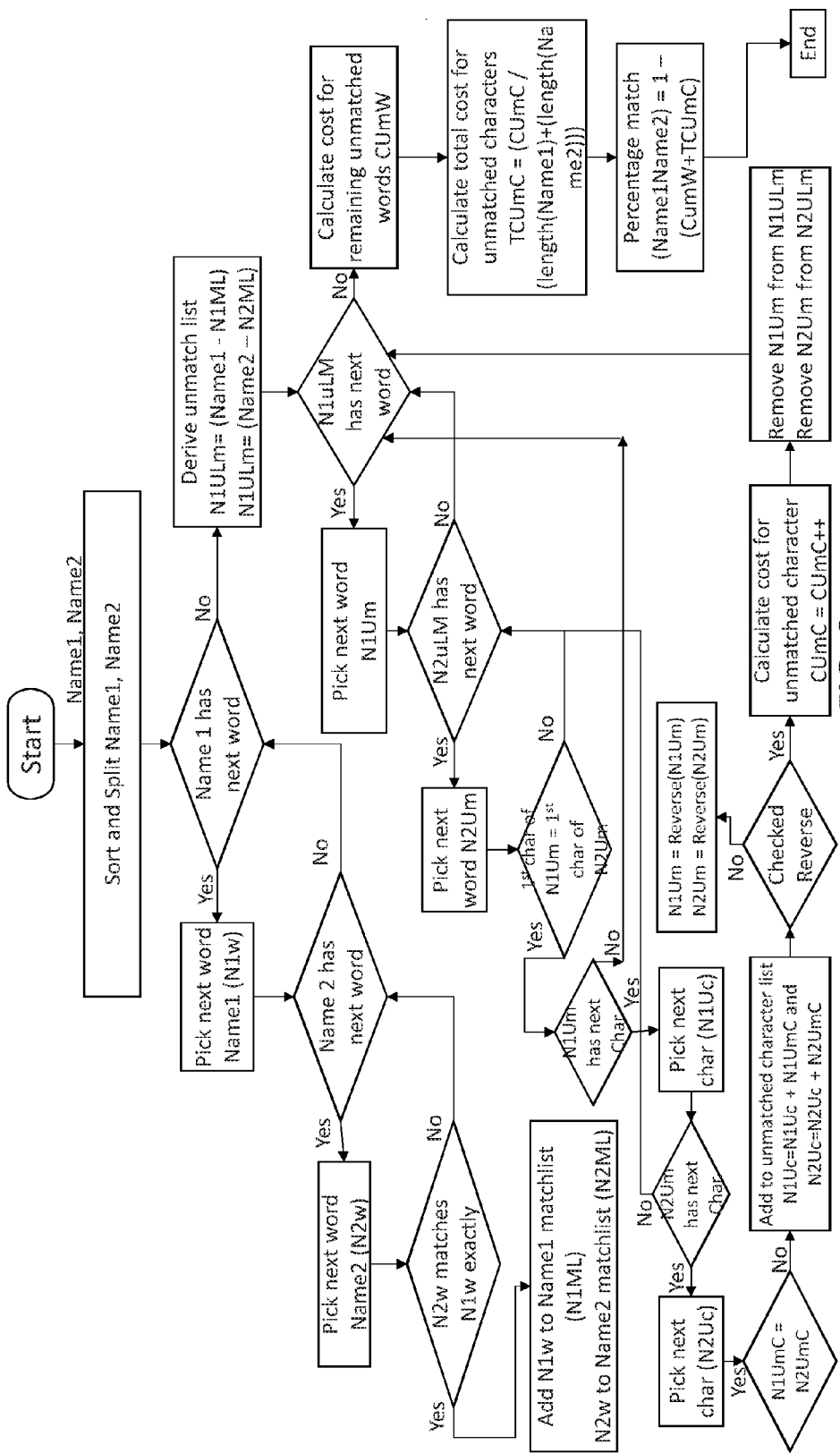
FIG. 8 shows a flow diagram of the NameKdiff algorithm, in accordance with an embodiment of the invention.
Figure 9:
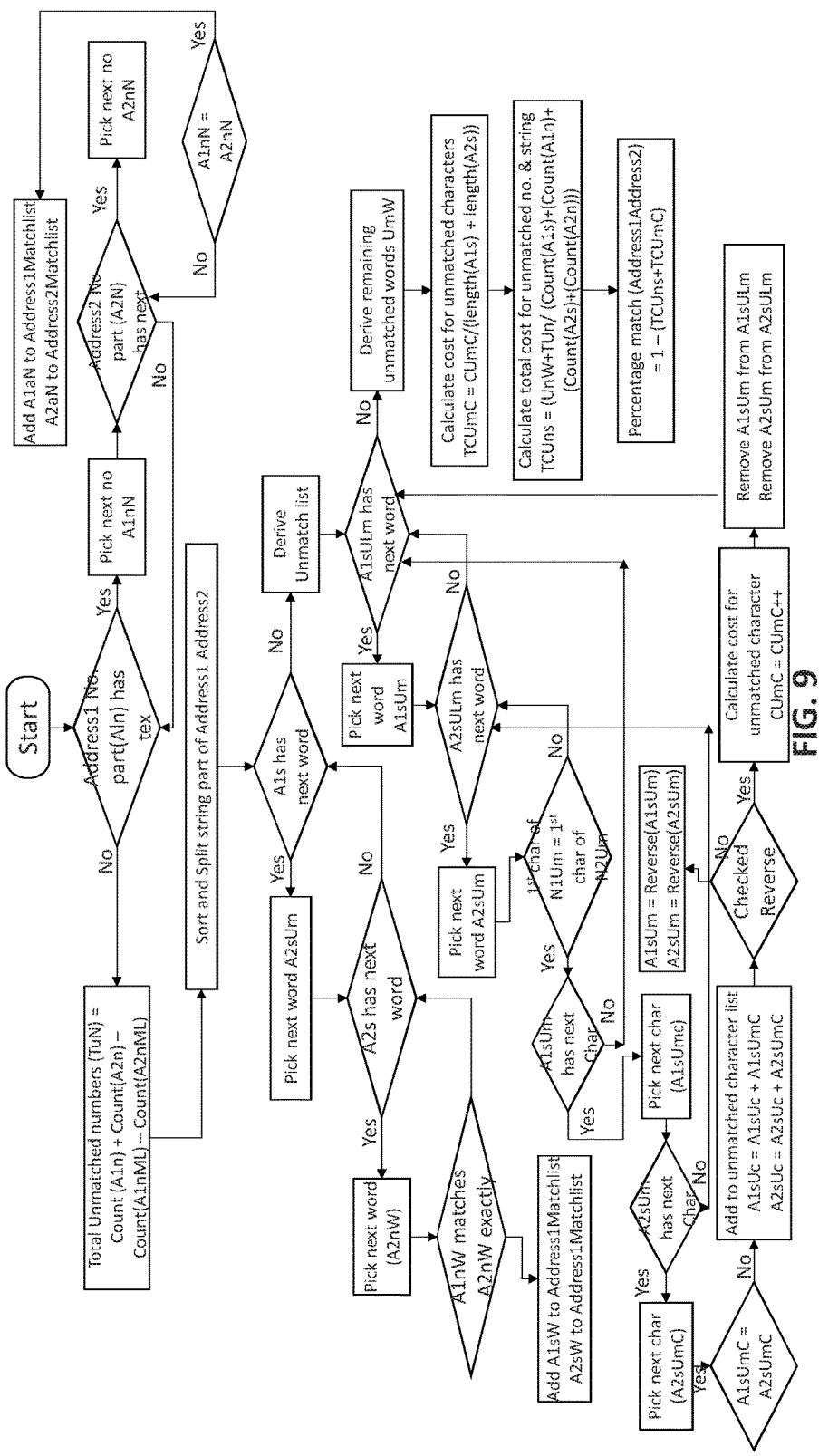
FIG. 9 shows a flow diagram of the AdressKdiff algorithm, in accordance with an embodiment of the invention.

According to an embodiment of the invention, the name match percentage calculation engine (306) calculates matching percentage between pluralities of the probable match identified by the probable name identification engine (304). The matching percentage between the pluralities of probable match is measured by the NameKdiff algorithm, wherein the NameKdiff algorithm takes two names as inputs and gives a percentage match as output. By comparing the matching percentage, pairs that gained the most percentage can be identified as the best match. The flowchart of the NameKdiff Logic is illustrated in FIG. 8 according to an embodiment of the invention.

Figure 4A:
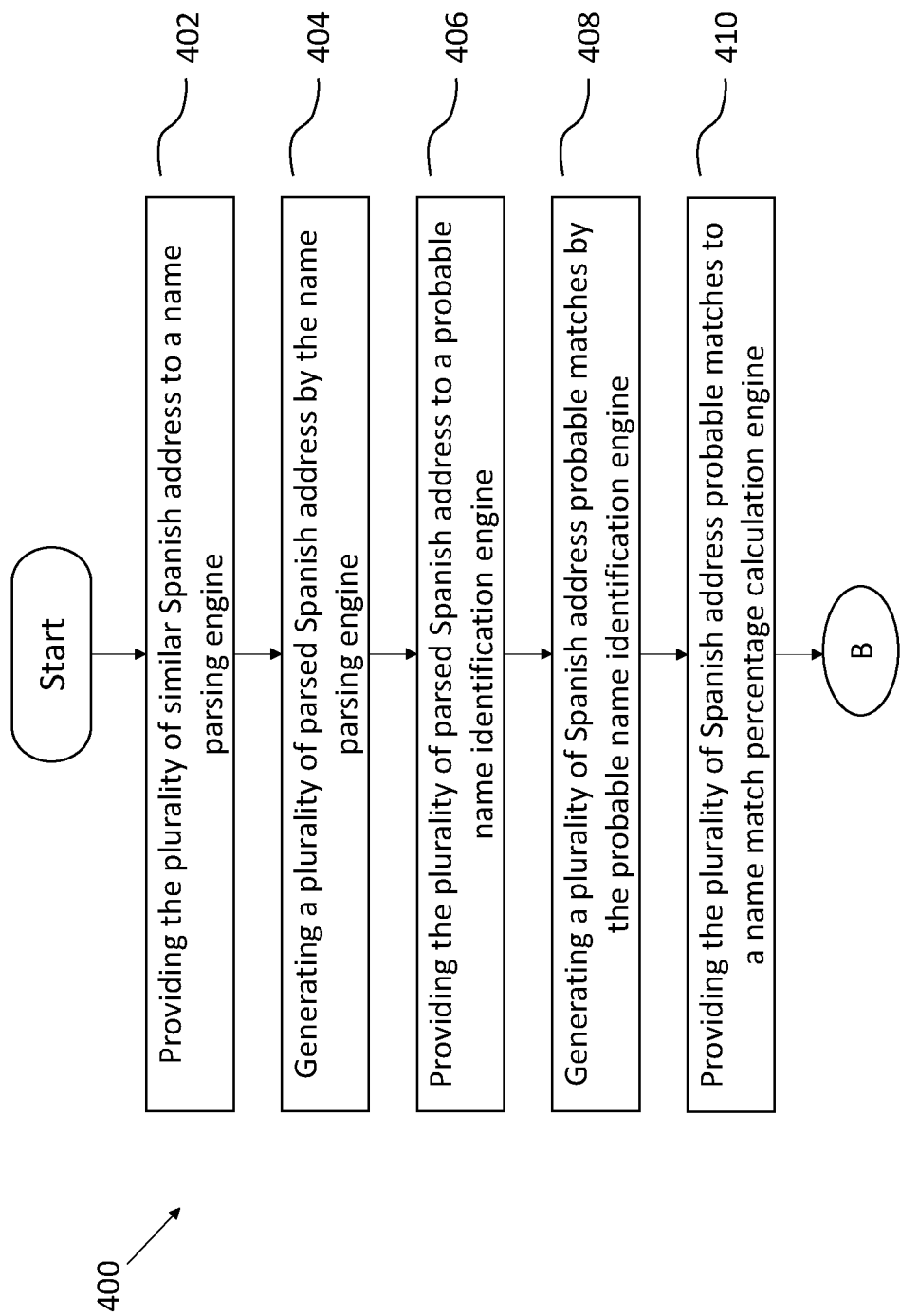
FIG. 4A and FIG. 4B show a flow diagram illustrating steps involved in identifying plurality of addresses match in accordance with an embodiment of the invention.
Figure 4B:
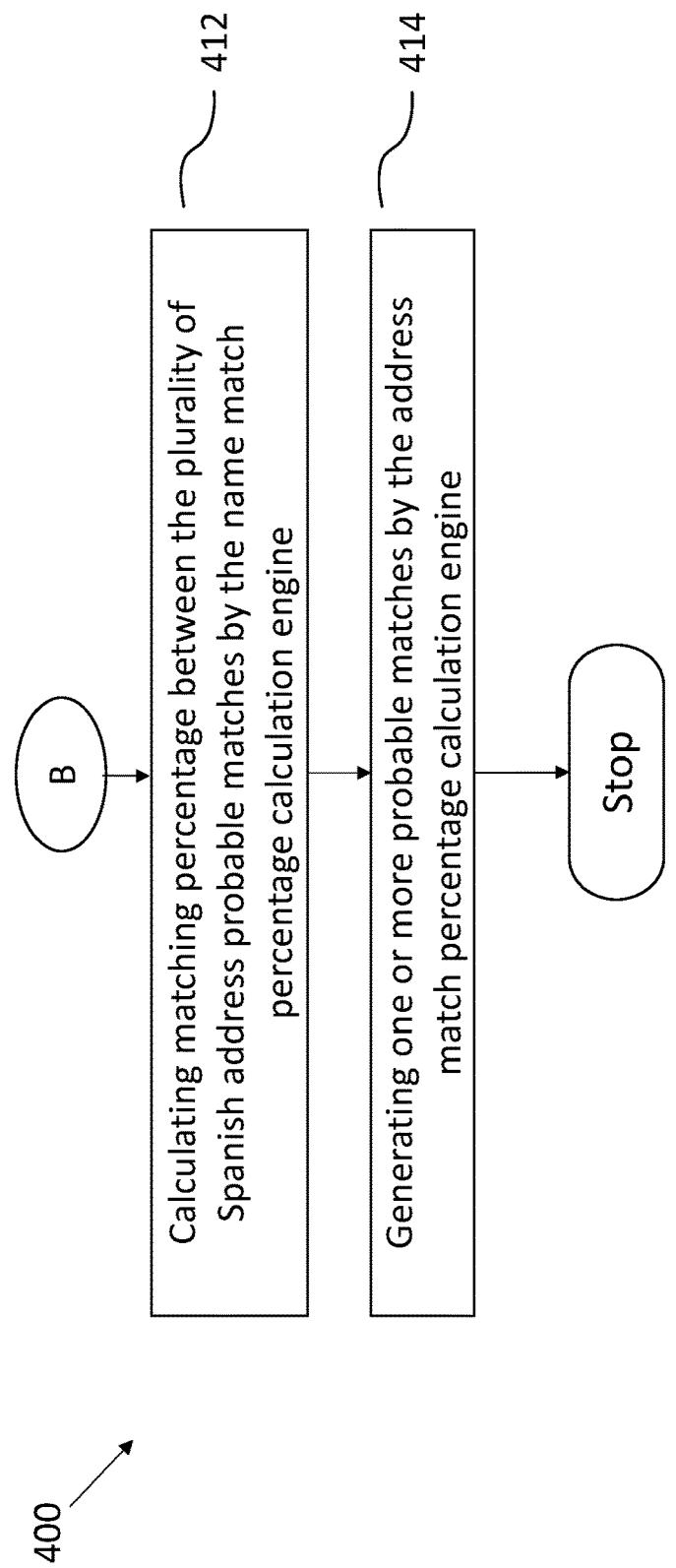

FIG. 4A and FIG. 4B illustrate a flowchart (400) indicating the steps performed within the modules 110. At step (402), a set of similar Spanish addresses are provided to an address parsing engine (502). At step (404), the address parsing engine (502) generates a plurality of parsed Spanish addresses. At step (406), the parsed Spanish addresses are provided to a probable address identification engine 504. At step (408), the probable address identification engine (504) generates a plurality of Spanish addresses probable matches. At step (410), the plurality of Spanish addresses probable matches are provided to an address match percentage calculation engine 506. At step (412), the address match percentage calculation engine 506 calculates matching percentage between the plurality of Spanish address probable matches. At step (414), the generated one or more probable matches are stored in the database 104.

Figure 5:
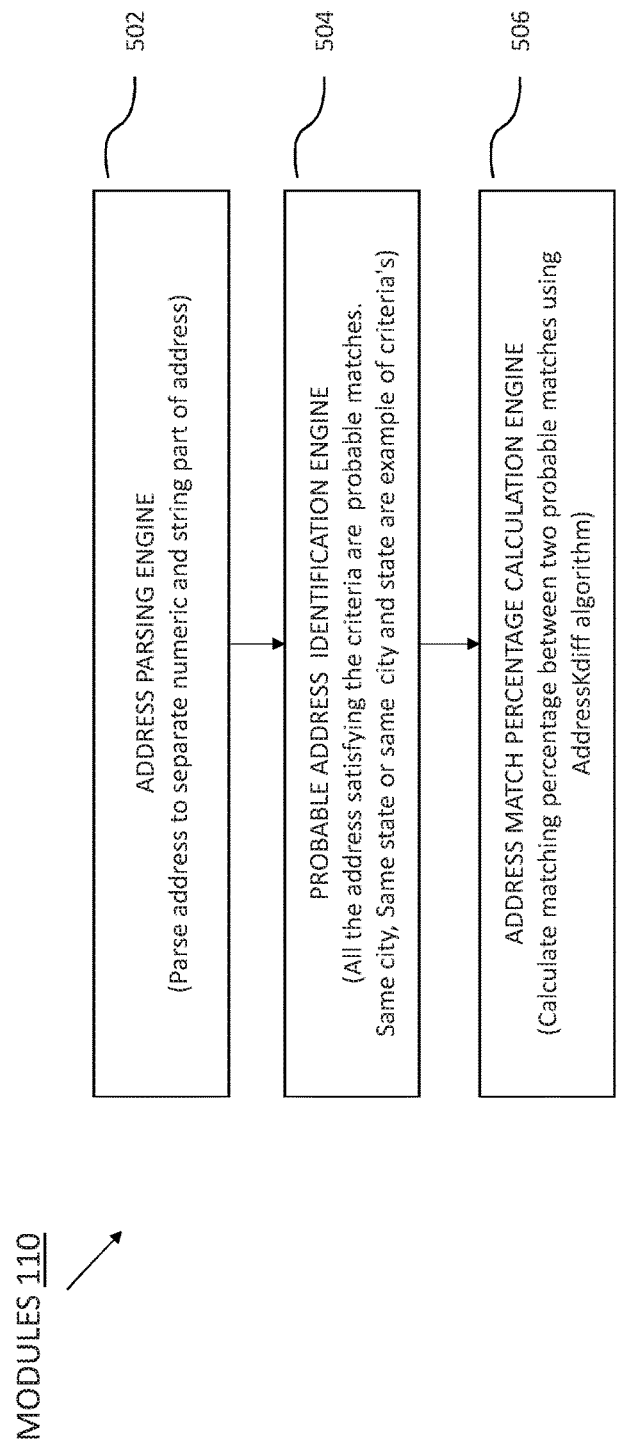
FIG. 5 shows a flow diagram illustrating in detail process of checking for a set addresses match, in accordance with an embodiment of the invention.

FIG. 5 illustrates a block diagram of the address module 114 wherein the block diagram further comprises an address parsing engine 502, a probable address identification engine 504, and an address match percentage calculation engine 506. The address parsing engine 502 parse address to separate numeric and string part of address. The probable address identification engine 504 satisfies plurality of address while identifying criteria of one or more probable matches, wherein the criteria can be same city, same state or same city and state. The address match percentage calculation engine 506, matches the percentage between pluralities of probable matches using the AddressKdiff algorithm.

In view of the foregoing, it will be appreciated that the present invention provides a method and system for maintaining the data quality in a database. Wherein the invention is more specific to data quality of Spanish name & address. Persons having ordinary skill in the art and technology to which this application pertains will appreciate that alterations and changes in the described structures and methods of operation can be practiced without meaningfully departing from the principle, spirit and scope.

What is claimed is:
1. A system for identifying and matching a plurality of similar Spanish names and addresses for a given set of data, the system comprising:
    a hardware processor;
    a memory for enabling the system for managing data quality of Spanish names and addresses in a database, wherein the memory comprises:

a parsing engine to receive the plurality of Spanish names and addresses from the database, wherein the parsing engine generates a set of parsed Spanish names and addresses;

a probable identification engine receiving the set of parsed Spanish names and addresses as an input and generating probable matches of plurality of Spanish names and addresses;

a match percentage calculation engine to calculate percentage match for the generated probable matches of plurality of Spanish names and addresses; and the database for storing one or more matched Spanish names and addresses, wherein the match percentage calculation engine further comprises a name match percentage calculation engine and an address match percentage calculation engine, wherein the name match percentage calculation engine calculates matching percentage between two probable matches using a NameKdiff algorithm and the address match percentage calculation engine calculates matching percentage between two probable matches using an AddressKdiff algorithm, wherein the memory, the database, the hardware processor, and the parsing engine, the probable identification engine and the match percentage calculation engine in the memory are coupled to a system bus.

2. The system of claim 1, wherein the parsing engine further comprises a name parsing engine and an address parsing engine, wherein the name parsing engine parses one or more First Names, one or more of Surname1 and Surname2 and the address parsing engine parses an address to separate a numeric and a string part.

3. The system of claim 1, wherein the probable identification engine further comprises a probable names identification engine and a probable address identification engine, wherein the names identification engine generates Soundex codes for one or more First Names, one or more of Surname1 and Surname2 and identifies probable matches for each of the First names based on generated Soundex codes, and the probable address identification engine identifies an address satisfying one or more criteria for probable matches.

* * * * *